(12) United States Patent
Lin

(10) Patent No.: US 10,534,345 B2
(45) Date of Patent: Jan. 14, 2020

(54) SPINDLE WITH INTELLIGENT AUTO-DETECTION SYSTEM

(71) Applicant: Wei-Ting Lin, Taichung (TW)

(72) Inventor: Wei-Ting Lin, Taichung (TW)

( * ) Notice: Subject to any disclaimer, the term of this patent is extended or adjusted under 35 U.S.C. 154(b) by 161 days.

(21) Appl. No.: 15/836,447

(22) Filed: Dec. 8, 2017

(65) Prior Publication Data

US 2019/0179287 A1 Jun. 13, 2019

(51) Int. Cl.
*G06F 19/00* (2018.01)
*G05B 19/4065* (2006.01)
*B23Q 15/12* (2006.01)
*B23Q 5/20* (2006.01)
*B23Q 5/10* (2006.01)

(52) U.S. Cl.
CPC .......... *G05B 19/4065* (2013.01); *B23Q 5/10* (2013.01); *B23Q 5/20* (2013.01); *B23Q 15/12* (2013.01)

(58) Field of Classification Search
CPC ............. B23Q 5/10; B23Q 5/20; B23Q 15/12
USPC .......................................................... 700/177
See application file for complete search history.

(56) References Cited

U.S. PATENT DOCUMENTS

| | | | |
|---|---|---|---|
| 2008/0214374 A1* | 9/2008 | Sugiyama .......... | B23Q 11/0035 483/54 |
| 2012/0173012 A1* | 7/2012 | Matsunaga .............. | B23Q 1/70 700/177 |
| 2014/0241821 A1* | 8/2014 | Mann ...................... | B23B 37/00 408/17 |
| 2018/0373211 A1* | 12/2018 | Dawidziak ................ | B27C 5/10 |

\* cited by examiner

*Primary Examiner* — Md Azad
(74) *Attorney, Agent, or Firm* — Che-Yang Chen; Law offices of Scott Warmuth

(57) ABSTRACT

A spindle with intelligent auto-detection system may comprise a spindle, a shell configured for covering the spindle, a first conducting ring, a second conducting ring and at least a sensor. The spindle has a connecting section and a working section, and the connecting section is configured for connecting a power unit of a processing machine. Moreover, a tool is secured on the working section, and the sensor is positioned in an inner tube of the spindle. The first conducting ring and the second conducting ring in a recess of the shell are respectively electrically connected to the sensor and an analytical instrument. When the spindle is spinning, the sensor is adapted to measure various data of statuses of the spindle and the processing machine, and the obtained data is configured to be sent to the analytical instrument, thereby achieving monitoring effect.

6 Claims, 5 Drawing Sheets

(12) United States Patent
US 10,534,345 B2

SPINDLE WITH INTELLIGENT AUTO-DETECTION SYSTEM

FIELD OF THE INVENTION

The present invention relates to a spindle and more particularly to a spindle with intelligent auto-detection system.

BACKGROUND OF THE INVENTION

Along with the change in times and technological flourishing, many factories are moving towards the automatic production that replaces traditional manual operation. However, because of automation, a single staff needs to be charge in the management of numerous machines, and it always happens that the machinery breakdown is not aware and addressed in the first place. Therefore, there remains a need for a new and improved design for a spindle with intelligent auto-detection system to overcome the problems presented above.

SUMMARY OF THE INVENTION

The present invention provides a spindle with intelligent auto-detection system which comprises a spindle, a shell configured for covering the spindle, a first conducting ring, a second conducting ring and at least a sensor. The spindle has a connecting section and a working section respectively protruding from an upper end and a lower end of the spindle, and the connecting section is configured for connecting a power unit of a processing machine such that the spindle is adapted to be driven by the power unit to have continuous spin. Moreover, an inner tube is formed inside the spindle for the installation of the sensor. The shell is secured on a sliding base of the processing machine such that the spindle is adapted to be driven by and have synchronous movements such as up-down shift and lateral shift with the shell. A stepped edge is configured to protrude from an inner periphery of the shell to form a recess at an upper portion of the shell, and an upper lid is adapted to couple at an upper end of the recess. At least a bearing is disposed between the stepped edge and the connecting section of the spindle, and the first conducting ring is coupled at an inner periphery of the second conducting ring to together position into the recess of the shell, wherein an inner periphery of the first conducting ring is coupled around the connecting section of the spindle while an outer periphery of the second conducting ring is coupled with the inner periphery of the shell. After the first conducting ring together with the second conducting ring is positioned into the recess, the upper lid is adapted to couple with and block the upper end of the recess. Furthermore, each of the first conducting ring and the second conducting ring is wound around by a coil, and an end of the coil wound around on the first conducting ring is pulled out a desired length from the first conducting ring to form a first wire section while an end of the coil wound around on the second conducting ring is pulled out a desired length from the second conducting ring to form a second wire section. The first wire section is configured to penetrate through the spindle into the inner tube to electrically connect to the sensor. Additionally, the shell comprises a through hole, and the second wire section is adapted to pass through the through hole to electrically connect to an analytical instrument. Also, a lower end of the second conducting ring is electrically connected to a circuit board.

Comparing with conventional spindle, the present invention is advantageous because: (i) the lifetime of the tool secured on the working section of the spindle is monitored such that the tool can be timely replaced; and (ii) the processing machine is monitored for preventing unexpected breakdown.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
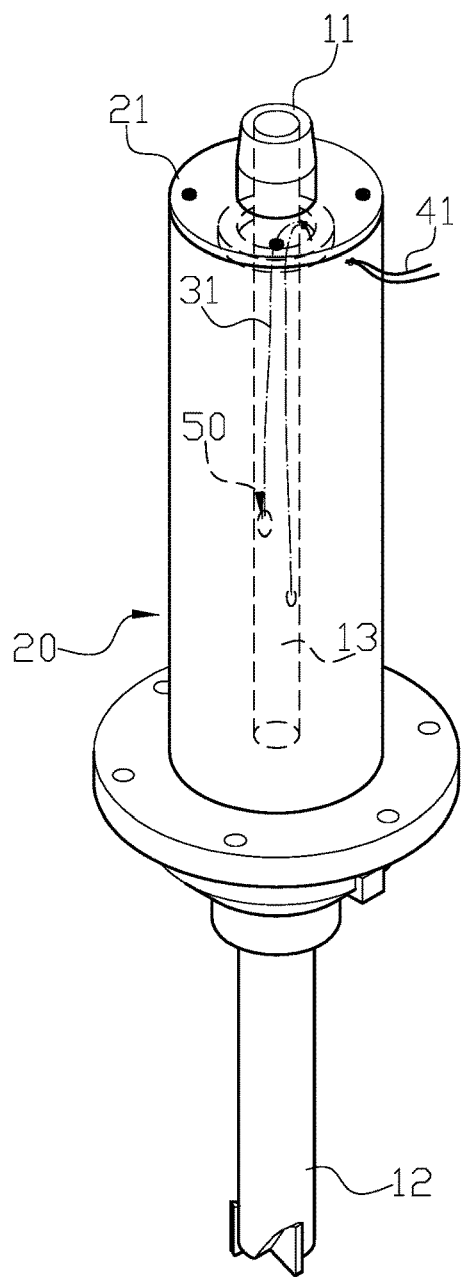
FIG. 1 is a three-dimensional assembly view of a spindle with intelligent auto-detection system in the present invention.
Figure 2:
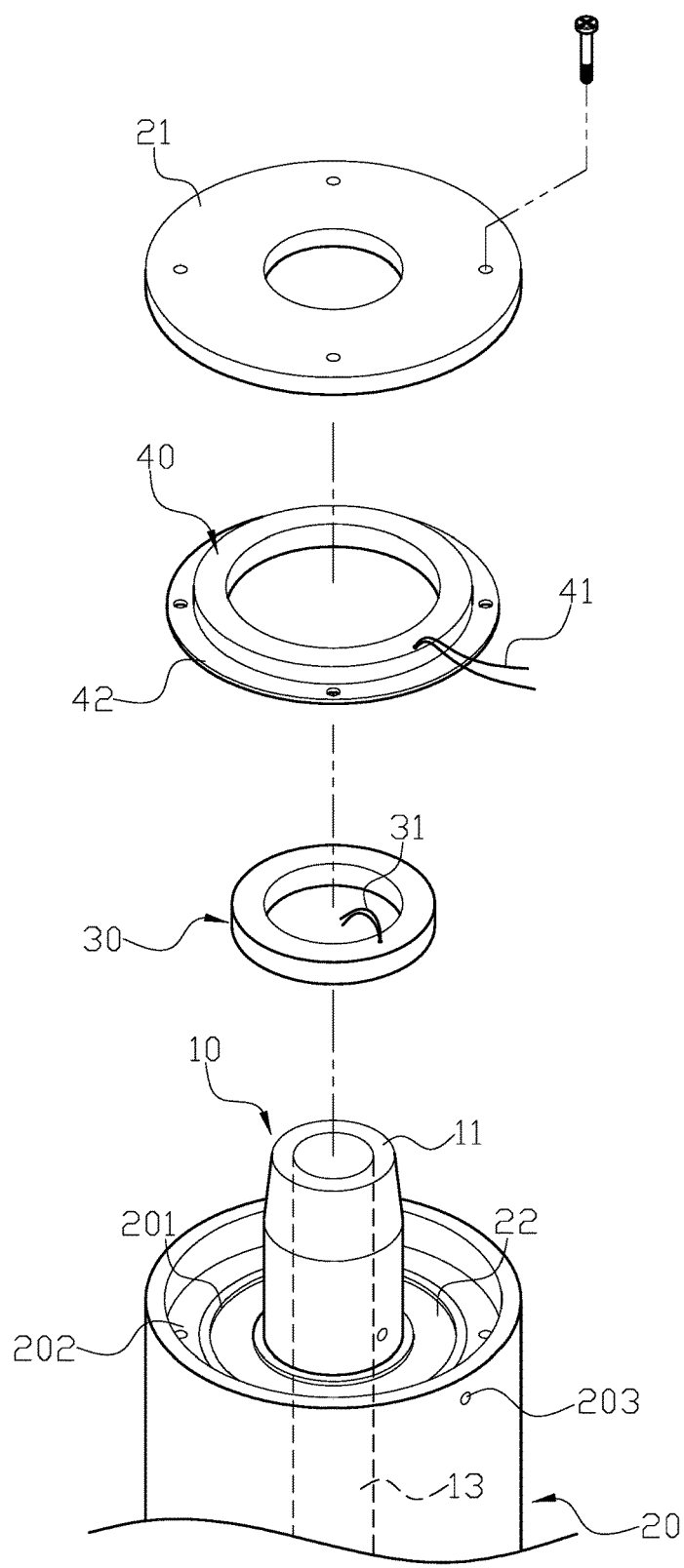
FIG. 2 is a three-dimensional exploded view of the spindle with intelligent auto-detection system in the present invention.
Figure 3:
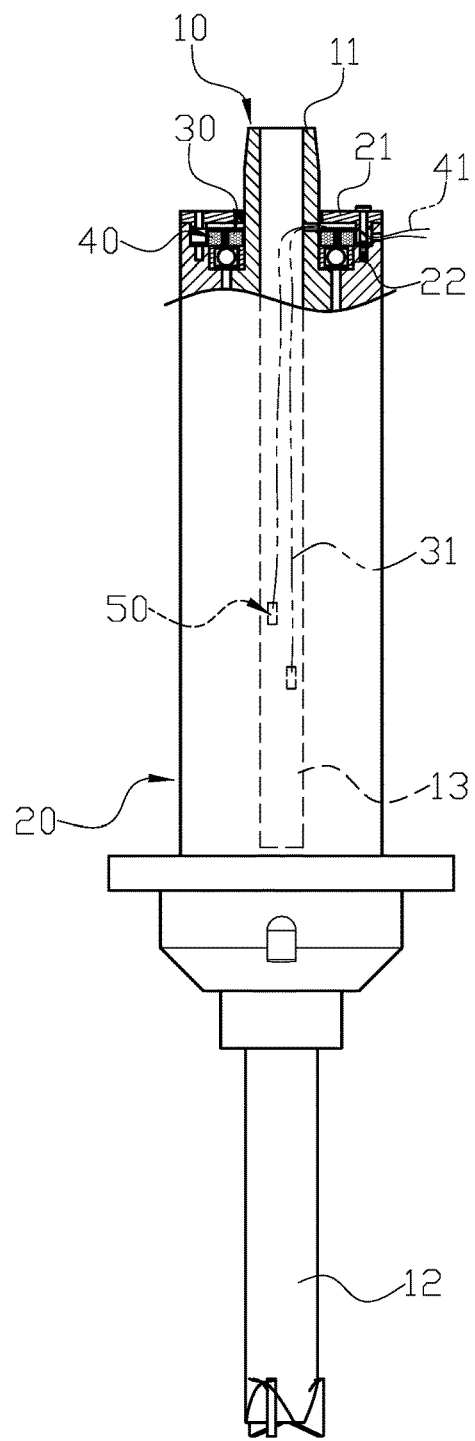
FIG. 3 is a sectional assembly view of the spindle with intelligent auto-detection system in the present invention.
Figure 4:
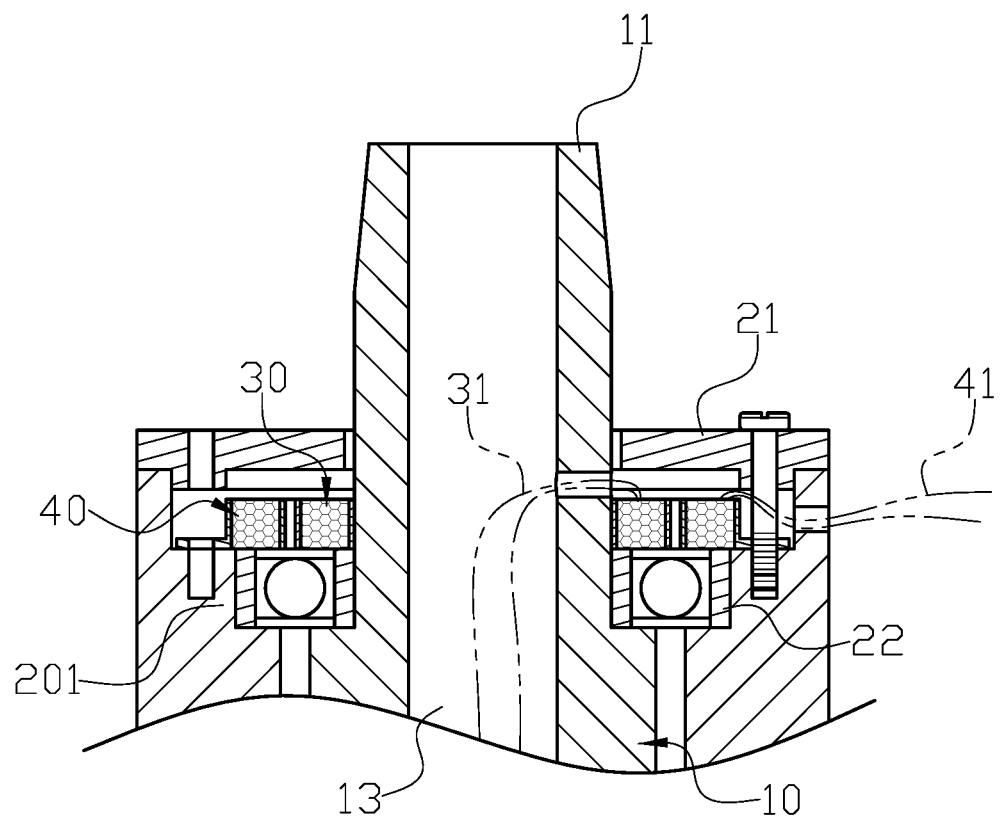
FIG. 4 is a partial enlarged view of FIG. 3.
Figure 5:
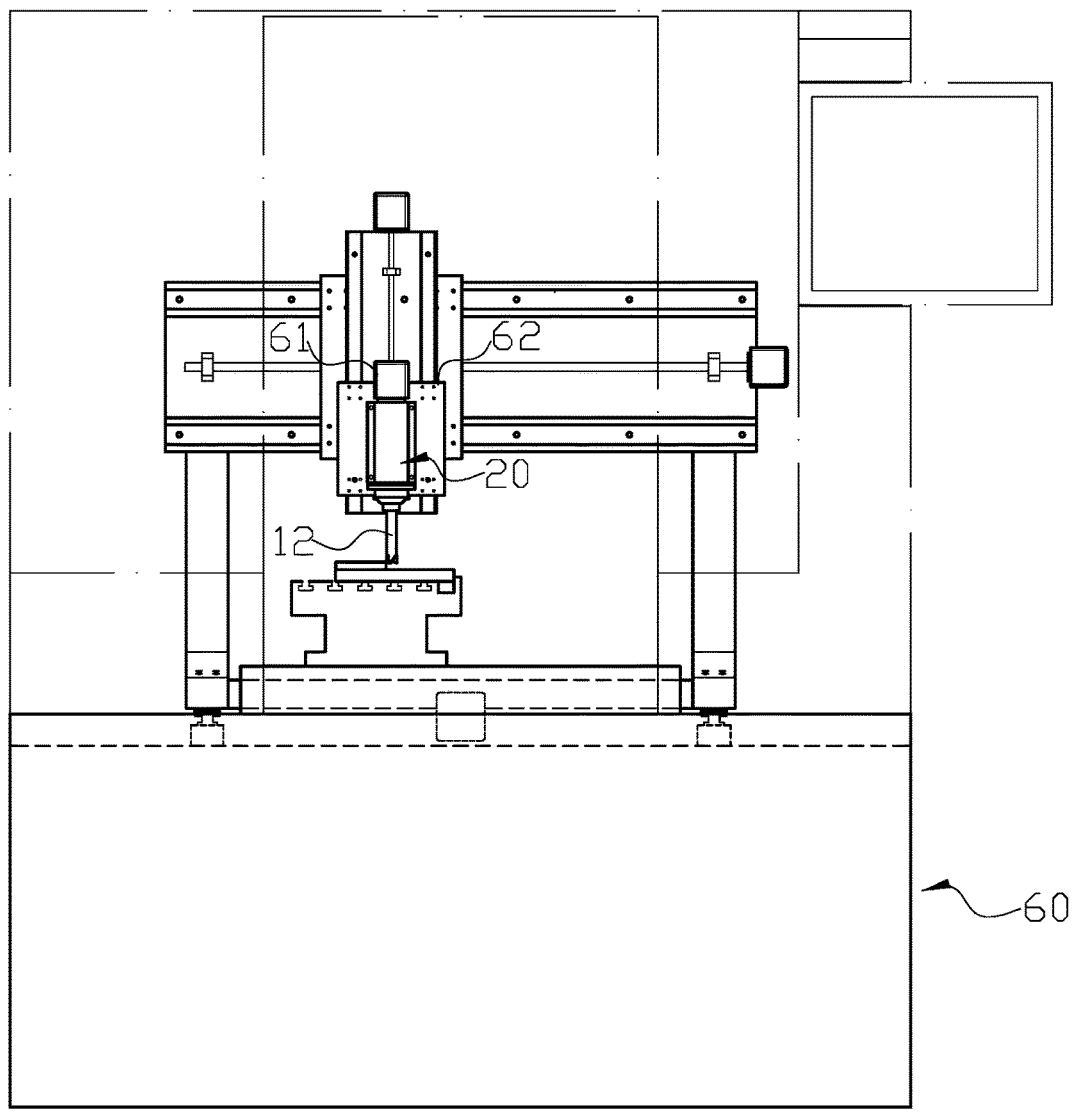
FIG. 5 is a schematic view illustrating the spindle of the present invention is installed on a processing machine.

In order to further understand the goal, characteristics and effect of the present invention, a number of embodiments along with the drawings are illustrated as following:

Referring to FIGS. 1 to 5, the present invention provides a spindle with intelligent auto-detection system which comprises a spindle (10), a shell (20) configured for covering the spindle (10), a first conducting ring (30), a second conducting ring (40) and at least a sensor (50). The spindle (10) has a connecting section (11) and a working section (12) respectively protruding from an upper end and a lower end of the spindle (10), and the connecting section (11) is configured for connecting a power unit (61) of a processing machine (60) such that the spindle (10) is adapted to be driven by the power unit (61) to have continuous spin. Moreover, an inner tube (13) is formed inside the spindle (10) for the installation of the sensor (50). The shell (20) is secured on a sliding base (62) of the processing machine (60) such that the spindle

(10) is adapted to be driven by and have synchronous movements such as up-down shift and lateral shift with the shell (20). A stepped edge (201) is configured to protrude from an inner periphery of the shell (20) to form a recess (202) at an upper portion of the shell (20), and an upper lid (21) is adapted to couple at an upper end of the recess (202). At least a bearing (22) is disposed between the stepped edge (201) and the connecting section (11) of the spindle (10), and the first conducting ring (30) is coupled at an inner periphery of the second conducting ring (40) to together position into the recess (202) of the shell (20), wherein an inner periphery of the first conducting ring (30) is coupled around the connecting section (11) of the spindle (10) while an outer periphery of the second conducting ring (30) is coupled with the inner periphery of the shell (20). After the first conducting ring (30) together with the second conducting ring (40) is positioned into the recess (202), the upper lid (21) is adapted to couple with and block the upper end of the recess (202). Furthermore, each of the first conducting ring (30) and the second conducting ring (40) is wound around by a coil, and an end of the coil wound around on the first conducting ring (30) is pulled out a desired length from the first conducting ring (30) to form a first wire section (31) while an end of the coil wound around on the second conducting ring (40) is pulled out a desired length from the second conducting ring (40) to form a second wire section (41). The first wire section (31) is configured to penetrate through the spindle (10) into the inner tube (11) to electrically connect to the sensor (50). Additionally, the shell (20) comprises a through hole (203), and the second wire section (41) is adapted to pass through the through hole (203) to electrically connect to an analytical instrument. Also, a lower end of the second conducting ring (40) is electrically connected to a circuit board (42).

In one embodiment, a tool is secured on the working section (12).

In another embodiment, the sensor (50) is an accelerometer.

In still another embodiment, the sensor (50) is a vibration meter.

In a further embodiment, the sensor (50) is a thermometer.

In actual application, the second wire section (41) of the second conducting ring (40) is electrically connected to an analytical instrument such as a computer. When the spindle (10) is spinning, the sensor (50) is adapted to measure various data including statuses of the spindle (50) and the processing machine (60), and the obtained data is configured to be sent to the analytical instrument in a manner of magnetic coupling between the first conducting ring (30) and the second conducting ring (40). Also, the second conducting ring (40) is configured to be fixed while the first conducting ring (30) is adapted to have synchronous spin with the spindle (10), which avoids the entanglement between the first wire section (31) and the second wire section (41). After receiving data, the analytical instrument is adapted to process analysis and comparison, and when received data shows any abnormalities such as overheated spindle (10) and the tool having abnormal vibrations, a staff can immediately do troubleshooting, thereby preventing the breakdown of the processing machine (60).

Comparing with conventional spindle, the present invention is advantageous because: (i) the lifetime of the tool secured on the working section (12) of the spindle (10) is monitored such that the tool can be timely replaced; and (ii) the processing machine (60) is monitored for preventing unexpected breakdown.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A spindle with intelligent auto-detection system comprising a spindle, a shell configured for covering the spindle, a first conducting ring, a second conducting ring and at least a sensor;
    wherein the spindle has a connecting section and a working section respectively protruding from an upper end and a lower end of the spindle, and the connecting section is configured for connecting a power unit of a processing machine such that the spindle is adapted to be driven by the power unit to have continuous spin;
    an inner tube is formed inside the spindle for the installation of the sensor;
    wherein the shell is secured on a sliding base of the processing machine such that the spindle is adapted to be driven by and have synchronous movements including up-down shift and lateral shift with the shell;
    a stepped edge is configured to protrude from an inner periphery of the shell to form a recess at an upper portion of the shell, and an upper lid is adapted to couple at an upper end of the recess;
    at least a bearing is disposed between the stepped edge and the connecting section of the spindle;
    wherein the first conducting ring is coupled at an inner periphery of the second conducting ring to together position into the recess of the shell;
    an inner periphery of the first conducting ring is coupled around the connecting section of the spindle while an outer periphery of the second conducting ring is coupled with the inner periphery of the shell;
    after the first conducting ring together with the second conducting ring is positioned into the recess, the upper lid is adapted to couple with and block the upper end of the recess;
    each of the first conducting ring and the second conducting ring is wound around by a coil, and an end of the coil wound around on the first conducting ring is pulled out a desired length from the first conducting ring to form a first wire section while an end of the coil wound around on the second conducting ring is pulled out a desired length from the second conducting ring to form a second wire section;
    the first wire section is configured to penetrate through the spindle into the inner tube to electrically connect to the sensor;
    the shell comprises a through hole, and the second wire section is adapted to pass through the through hole to electrically connect to an external apparatus;
    a lower end of the second conducting ring is electrically connected to a circuit board; and
    the circuit board is configured to analyze and compare received data by the at least one sensor to process the abnormality having abnormal vibration and monitor to prevent the breakdown of a tool and processing machine.

2. The spindle with intelligent auto-detection system of claim 1, wherein a tool is secured on the working section.

3. The spindle with intelligent auto-detection system of claim 1, wherein the sensor is an accelerometer.

4. The spindle with intelligent auto-detection system of claim 1, wherein the sensor is a vibration meter.

5. The spindle with intelligent auto-detection system of claim 1, wherein the sensor is a thermometer.

6. The spindle with intelligent auto-detection system of claim 1, wherein the external apparatus is an analytical instrument such as a computer.

* * * * *